Jan. 13, 1959 — W. B. MEARNS — 2,867,935
FISH LURES
Filed Dec. 9, 1957
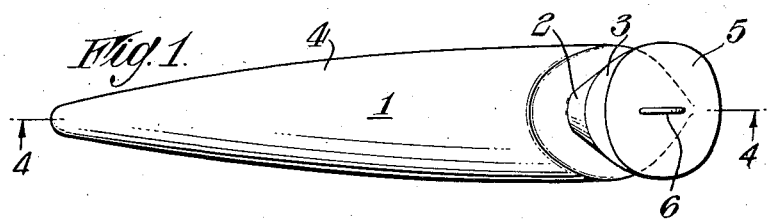
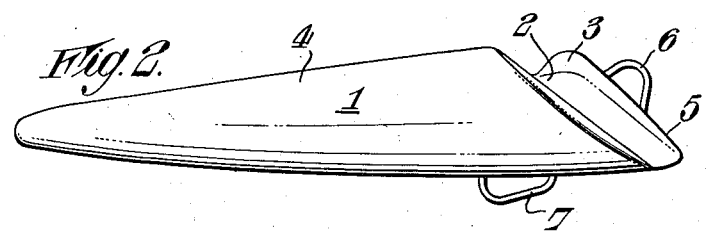
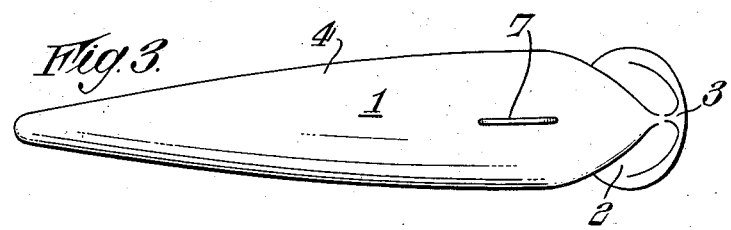
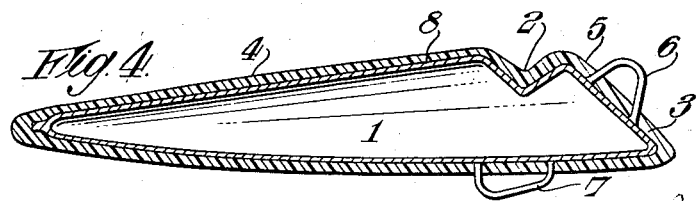
Inventor:
William B. Mearns
By Cushman, Darby & Cushman
Attorneys

United States Patent Office 2,867,935
Patented Jan. 13, 1959

2,867,935

FISH LURES

William B. Mearns, Nanaimo, British Columbia, Canada

Application December 9, 1957, Serial No. 701,658

1 Claim. (Cl. 43—42.35)

This invention relates to fish lures. More particularly it relates to a fish lure which will similate the actions of a small maimed fish.

It is known by those skilled in the art of fishing, that many species of medium to large game fish, as exemplified by some members of the salmon family, feed mainly on smaller species of fish which commonly swim in schools. The herring is an example of such a small fish. In order to catch a large number of these small fish the large fish dash quickly through a school of small fish, thus maiming many members of the school. The maimed fish are subsequently caught and eaten with ease by the attacking fish.

The object of this invention is to provide a fish lure of the type which, when pulled through the water, imitates the movements of a small maimed fish.

The embodiments of the invention as outlined below are to be taken as exemplary and descriptive thereof but not restrictive.

In the drawings which illustrate my invention:

Figure 1 is a plan view of the lure;
Figure 2 is the side elevation of the lure;
Figure 3 is the underside view of the lure; and
Figure 4 is a transverse section of the lure taken along the line 4—4 of Figure 1.

In the drawing, the fish lure is constituted by an elongated member indicated generally at 1 of tapering cross-section having a groove 2. The groove 2 divides the member 1 into a head portion 3 and a main body portion 4.

The head portion 3, which serves as the leading end of the member 1, has a substantially flat outer face 5 which, as will be seen from Figures 2 and 3, extends away from the direction of movement of the fish lure upwardly and rearwardly from a lower leading edge of the member 1.

The groove 2 which substantially encircles the base of the head 3, is V-shaped and extends at an angle upwardly and rearwardly from a point adjacent the lower leading edge of the member 1 to a point located a predetermined distance from an upper leading edge of said member 1 or, in other words, the V-shaped groove 2 lies in a plane which passes through, or is adjacent to, the lower leading edge of the member 1, said plane being at least co-planar with the outer face 5 of the head portion 3 and at an angle to the longitudinal axis of the member 1.

One face of the groove 2 forms the underside of the head 3 whereas the remaining face of the groove 2 forms a substantially flat leading face of the main body portion 4, the outer face 5 of the head portion 3 and the flat leading face of the main body portion 5 being in spaced parallel relationship with one another and being arranged at an angle to the longitudinal axis of the lure.

A loop 6, projecting from the outer face 5, serves as an anchorage for a fishing line (not shown) whilst a second loop 7 projecting from the underside of the main body portion 4 serves as an anchorage for at least one fish hook (also not shown).

The preferred embodiment of the invention includes a metal web 8 (see Figure 4) located and secured between a pair of moulded plastic concavo-convex shells, only one of which is shown in Figure 4, each of said shells being formed to provide one half of the body, groove and head of the fishing lure, which shells, after positioning of the web 8 therebetween, are then joined, one to the other, at their adjacent edges by any known fluid tight method. The web 8 and the loops 6 and 7 are of material sufficiently strong enough to cater for the stresses to which the lure would normally be subjected.

Alternatively, the web 8 may be omitted entirely from the assembly and the concavo-convex shells made thicker in section and/or of stronger plastic than that which might be used in the first mentioned embodiment. In this form of the invention, the loops 6 and 7 are sandwiched in their respective positions by the half shells when the latter are joined together.

The exterior surface of the fish lure may be finished in any colour, the usual painting scheme being one which resembles the colouring of a species of small fish.

The operation of the lure, when drawn through water with sufficient velocity, is such that resistance set up by the flat outer face 5 will tend to urge the lure downwardly whilst water passing through the V-shaped groove will impart an erratic path of travel to the lure thereby similating the movement and action of a small maimed fish.

I claim:

A fish lure constituted by an elongated member of tapering cross-section, said member being provided with a V-shaped groove so as to define said member into a head portion, serving as the leading end of said member, and a main body portion, said head having a substantially flat outer face extending at an angle upwardly and rearwardly from a lower leading edge of said member, said V-shaped groove substantially encircling the base of said head and extending at an angle upwardly and rearwardly from a point adjacent said lower leading edge to a point located a predetermined distance from an upper leading edge of said member, one face of said V-shaped groove forming the underside of said head portion whereas the remaining face of said V-shaped groove forms a substantially flat leading face of said main body portion, said flat leading face being in spaced parallel relation with said flat outer face of said head and, together with the latter, being arranged at an angle to the longitudinal axis of said member, said substantially flat outer face and said groove combining, when said lure is drawn through water, respectively to urge the lure downwardly and impart an erratic path of travel thereto.

References Cited in the file of this patent

UNITED STATES PATENTS

| | | |
|---|---|---|
| D. 150,110 | Cole | July 6, 1948 |
| 2,520,444 | Smith | Aug. 29, 1950 |
| 2,575,139 | Smith | Nov. 13, 1951 |
| 2,714,779 | Heiner | Aug. 9, 1955 |